UNITED STATES PATENT OFFICE.

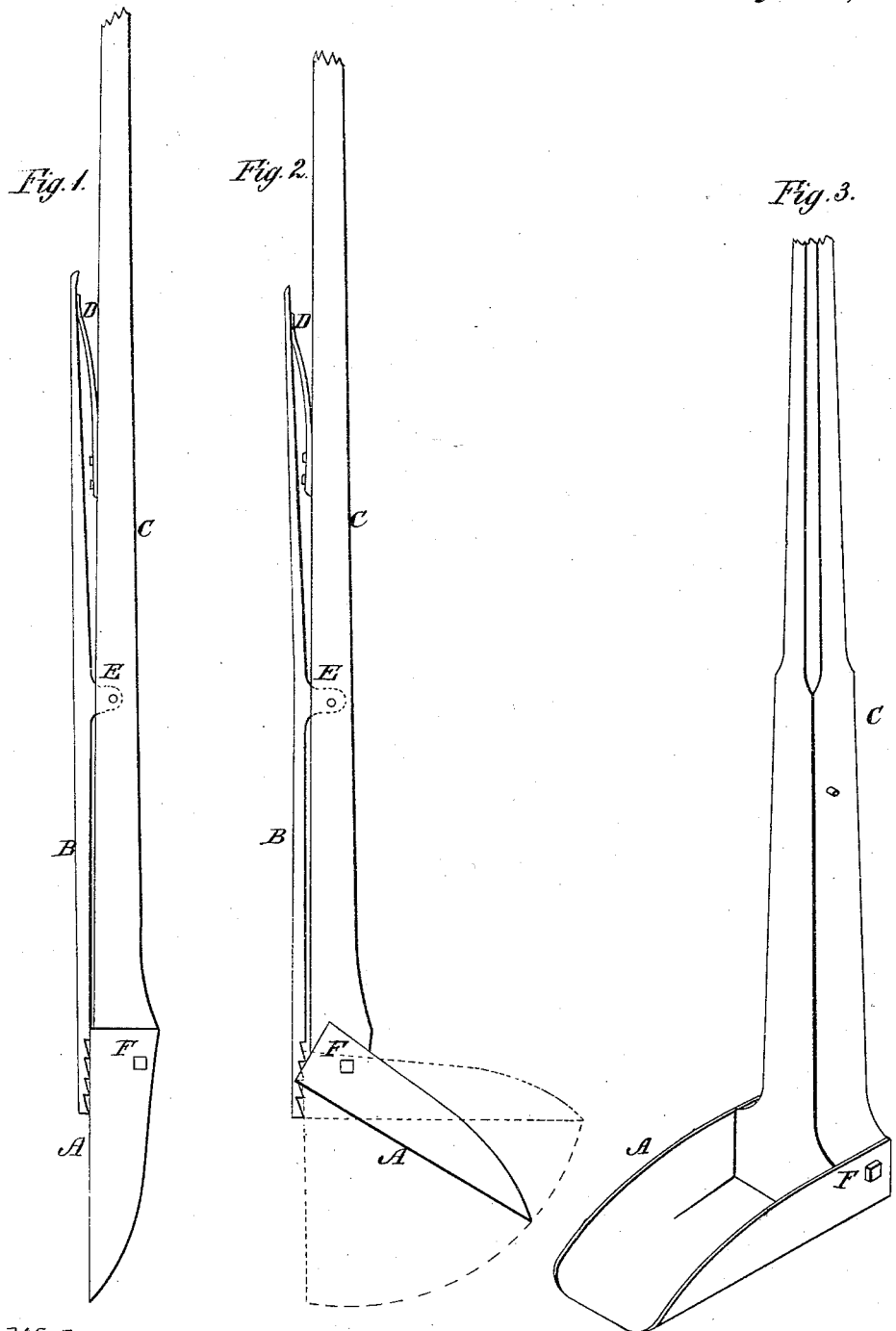

CALEB WINEGAR, OF UNION SPRINGS, NEW YORK.

IMPROVED EXCAVATING-MACHINE.

Specification forming part of Letters Patent No. 57,614, dated August 28, 1866.

*To all whom it may concern:*

Be it known that I, CALEB WINEGAR, of Union Springs, in the county of Cayuga and State of New York, have invented a new and useful implement for the purpose of excavating perpendicular holes and to excavate generally by means of a hinged shovel; and I do hereby declare that the following is a full, clear, and exact description of the construction and operation of the same, reference being had to the annexed drawings, making a part of this specification, in which—

Figure 1 is a side view; Fig. 2, also a side view, but shows the shovel in different positions. Fig. 3 is a front perspective view.

The same letters refer to the same parts in each figure.

A represents the hinged shovel or spade; B, a bar of iron attached to the handle and hinged at E, having the notches at G to hold the shovel in the desired position, and in connection with the handle C and spring D to operate the hinged shovel A. D is a spring to hold the notches in the iron B in contact with the back end of the hinged shovel A. C is the handle. E represents the bolt that passes through the handle to hold the bar B, and is the fulcrum for said bar. F is a bolt passing through the sides of the shovel and through the handle, and forms the hinge upon which the shovel-blade works.

In Fig. 3 the hinged shovel stands at right angles with the handle.

The implement is operated as follows: The shovel is driven into the ground the same as the ordinary shovel. Then the operator, if desired, can shove back the handle. The back of the shovel catches into one of the notches; then a back pull on the handle operates the shovel. Thus by a back-and-forward motion of the handle the shovel is worked from a perpendicular to a horizontal position, and forced under the dirt or material to be raised at the will of the operator in the manner of a capstan, and the end of the bar B holds the shovel firmly in the desired position. Thus the depth a hole may be dug is only controlled by the length of the handle, which may be of any desired length. After the material is elevated the upper end of the bar B is compressed toward the handle, and that removes the notched bar from the shovel and allows the shovel to straighten and discharge ready for further use. The spring D then presses the notches back in position to hold and control the shovel, as before stated.

What I claim as my invention, and desire to secure by Letters Patent, is—

The hinged shovel A, operated by means of the handle C, notched bar B, and spring D, not confining myself to the precise arrangement, but to equivalent means, substantially the same, to accomplish the same object.

CALEB WINEGAR.

Witnesses:
WILLIAM J. WINEGAR,
LEVI COLLINS.